United States Patent [19]

Fenton

[11] Patent Number: 4,892,183

[45] Date of Patent: Jan. 9, 1990

[54] TAKE-OUT MECHANISM FOR A GLASS CONTAINER FORMING MACHINE

[75] Inventor: Frank A. Fenton, Granby, Conn.

[73] Assignee: Emhart Industries, Inc., Hartford, Conn.

[21] Appl. No.: 236,494

[22] Filed: Aug. 25, 1988

[51] Int. Cl.$^4$ .............................................. B65G 37/00
[52] U.S. Cl. ................................ 198/468.3; 198/436; 65/260; 414/751; 901/7
[58] Field of Search .................... 901/7, 16; 414/751, 414/752, 753; 198/427, 436, 468.3; 65/239, 241, 260

[56] References Cited

U.S. PATENT DOCUMENTS

| | | | |
|---|---|---|---|
| 3,598,221 | 8/1971 | Klimaschka | 198/468.2 X |
| 4,005,782 | 1/1977 | Crockett | 901/16 X |
| 4,244,725 | 1/1981 | Fenton | 65/260 |
| 4,773,523 | 9/1988 | Hansen, Jr. et al. | 901/8 X |

FOREIGN PATENT DOCUMENTS 0170510 5/1986 European Pat. Off.
1598539 9/1981 United Kingdom.

Primary Examiner—Robert J. Spar
Assistant Examiner—Donald W. Underwood
Attorney, Agent, or Firm—Spencer T. Smith

[57] ABSTRACT

The take-out mechanism comprises first and second container gripping structures (50a, 50b) and independently operable moving structures (58a, 70a, 72a; 58b, 70b, 72b) therefor. Each moving structure comprises a first horizontally-disposed linear motor (70a; 70b) operable to move the gripping structures horizontally along the center-line of the machine, a second horizontally-disposed linear motor (72a; 72b) disposed perpendicularly relative to the first horizontally-disposed linear motor and operable to move the gripping structures horizontally perpendicular to said center-line, and a vertically-disposed linear motor (58a; 58b) operable to lower the gripping structures from the level at which they are moulded in the machine to a level at which they can be released on to a conveyor (30).

2 Claims, 5 Drawing Sheets

TAKE-OUT MECHANISM FOR A GLASS CONTAINER FORMING MACHINE

BACKGROUND OF THE INVENTION

This invention is concerned with a take-out mechanism for a glass container forming machine, e.g. a glass container forming machine of the individual section type.

Conventional take-out mechanisms remove finished containers from the machine by gripping them around a neck portion thereof by tongs which are mounted on an end of an arm which can move arcuately about a horizontal axis. The arm moves arcuately to bring the containers over a dead plate on which the containers are deposited by opening the tongs. The containers stand on the dead plate and are then swept on to a moving conveyor by a push-out which moves arcuately about a vertical axis. The conveyor, conventionally, collects containers from a plurality of section (or machines) and accordingly has to operate rapidly. Thus, in a high-speed machine, each container is moved rapidly by the take-out, the push-out and the conveyor. The container is thus subject to contact with several items including the dead plate and is subjected to considerable mechanical and thermal stress which causes defects leading to reduced strength and higher reject rates.

Previous proposals for a take-out which reduces the number of items which contact the containers are described in GB Patent Specification Nos. 1598539 and 2162484. However, these proposals involve mounting two gripping means on a carriage which moves perpendicularly to the centre-line of the machine to bring the gripping means alternately to the centre-line of the machine. Once on the centre-line of the machine, a gripping means is moved horizontally and vertically to grip and remove containers from the machine. Thus, the carriage obstructs access to the machine and, as both gripping means are mounted on the carriage, they do not operate independently and cannot be separated to allow access between them.

It is an object of this invention to provide a take-out mechanism in which the amount of contacts with the container and the speed at which the container is moved are reduced without reducing unacceptably as have earlier proposals operator access to the machine.

BRIEF DESCRIPTION OF THE INVENTION

The invention provides a take-out mechanism for a glass container forming machine, the mechanism being operable to remove completed containers from a moulding station of the machine and to deposit them on one or more conveyors, the mechanism comprising a first and a second container gripping means each operable to grip or release one or more containers, and first and second moving means each operable to move a respective one of the first and the second gripping means, the first and second moving means being operable to cause the first and second gripping means to alternate in gripping containers at the moulding station and in releasing containers, the first and the second moving means being independently operable and each comprising a first horizontally-disposed linear motor means mounted at a higher level than the moulding station and operable to move the gripping means horizontally to and from the moulding station along the centre-line of the machine, a second horizontally-disposed linear motor means mounted at a higher level than the moulding station, disposed perpendicularly relative to the first horizontally-disposed linear motor means, and operable to move the gripping means horizontally perpendicular to said centre-line of the machine towards and away from the centre-line, and a vertically-disposed linear motor means operable to lower the gripping means from the level of the moulding station to a level at which containers gripped by the gripping means can be deposited on to a conveyor and back to the level of the moulding station.

With a mechanism according to the last preceding paragraph, containers can be transferred to a conveyor without contact with a dead plate or a push out also, because two gripper means are associated with each machine, the containers can be moved more slowly than with conventional mechanisms, furthermore access can be obtained to the machine between the gripping means by moving them apart.

Preferably, said linear motor means are piston and cylinder assemblies. Each container gripping means may comprise tongs supported on the piston rod of a vertically disposed piston and cylinder assembly, a first horizontally-disposed piston and cylinder assembly aligned parallel to the centre-line of the machine and operable to move the cylinder thereof along a piston rod thereof, the cylinder of the vertically-disposed piston and cylinder assembly being mounted on the cylinder of the first horizontally-disposed piston and cylinder assembly, and a second horizontally-disposed piston and cylinder assembly fixed to the frame of the machine, and operable to move the first horizontally-disposed piston and cylinder assembly perpendicularly to the centre-line of the machine.

BRIEF DESCRIPTION OF THE DRAWINGS

There now follows a detailed description, to be read with reference to the accompanying drawings, of a take-out mechanism which is illustrative of the invention and of associated glass container forming apparatus.

In the drawings.

DETAILED DESCRIPTION OF PREFERRED EMBODIMENT OF THE INVENTION

Figure 1:
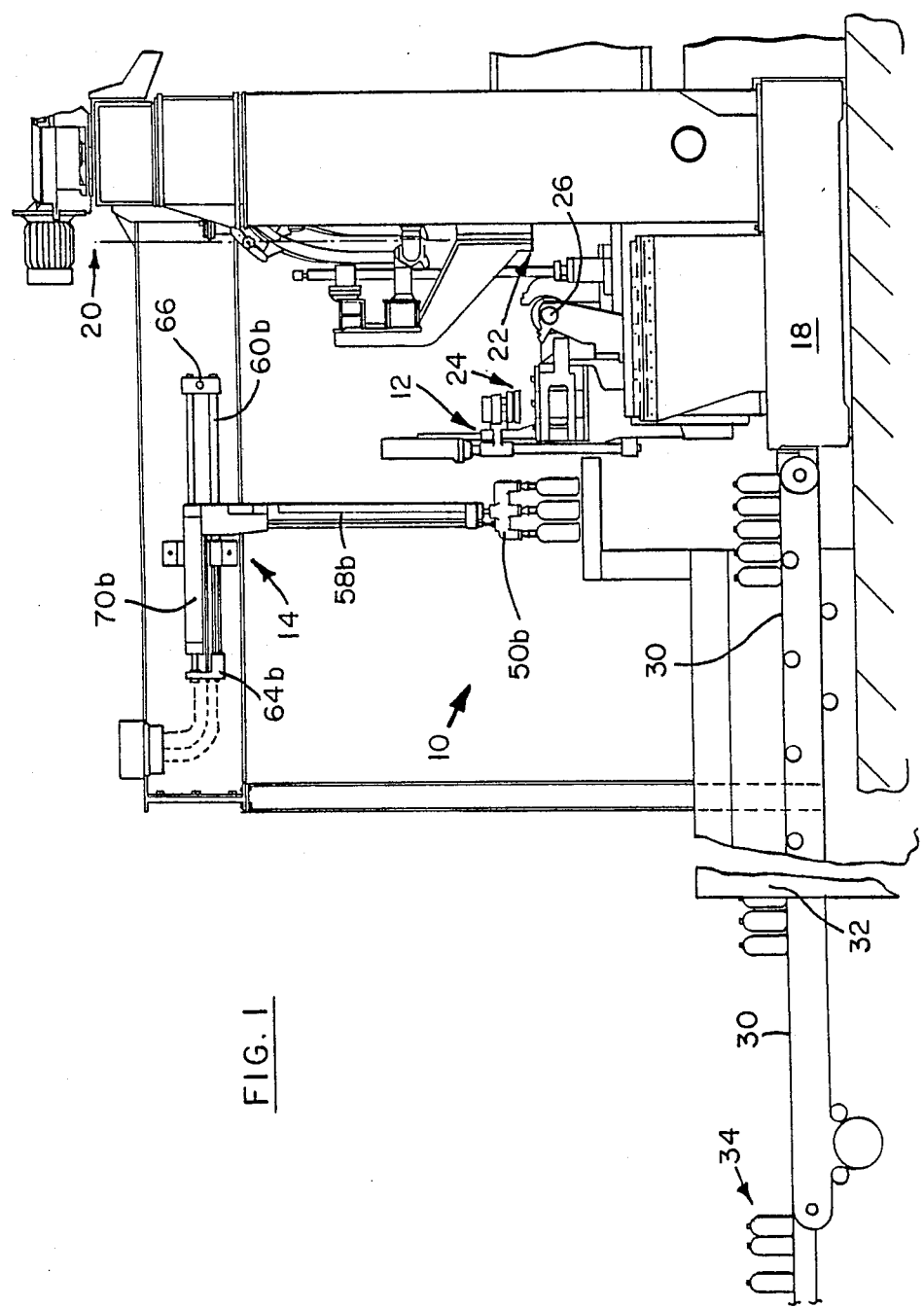
FIG. 1 is a side elevational view of the illustrative mechanism showing it installed in a machine.

The glass containing forming machine 10 shown in FIG. 1 is a machine of the individual section type of conventional construction except as far as the blowhead mechanism 12, the take-out mechanism 14, and the conveyor 16 thereof are concerned. As is conventional, the machine 10 (or section of the machine) forms one of a number arranged side by side on a common base 18 which are supplied with glass from a common gob distributor 20. The machine 10 moulds gobs from the distributor 20 into parisons at a parison-moulding station 22 thereof, transfers the parisons to a final moulding station 24 using an invert mechanism 26, and blows the parisons into containers at the moulding station 24. The blowhead mechanism 12 is used, in a conventional manner, to position blowheads on moulds at the moulding station 24 but is inverted relative to a conventional blow-head mechanism to allow more clearance for the take-out mechanism 14 i.e. the piston and cylinder assembly which moves the blow-heads is above the blow-heads instead of below.

Figure 2:
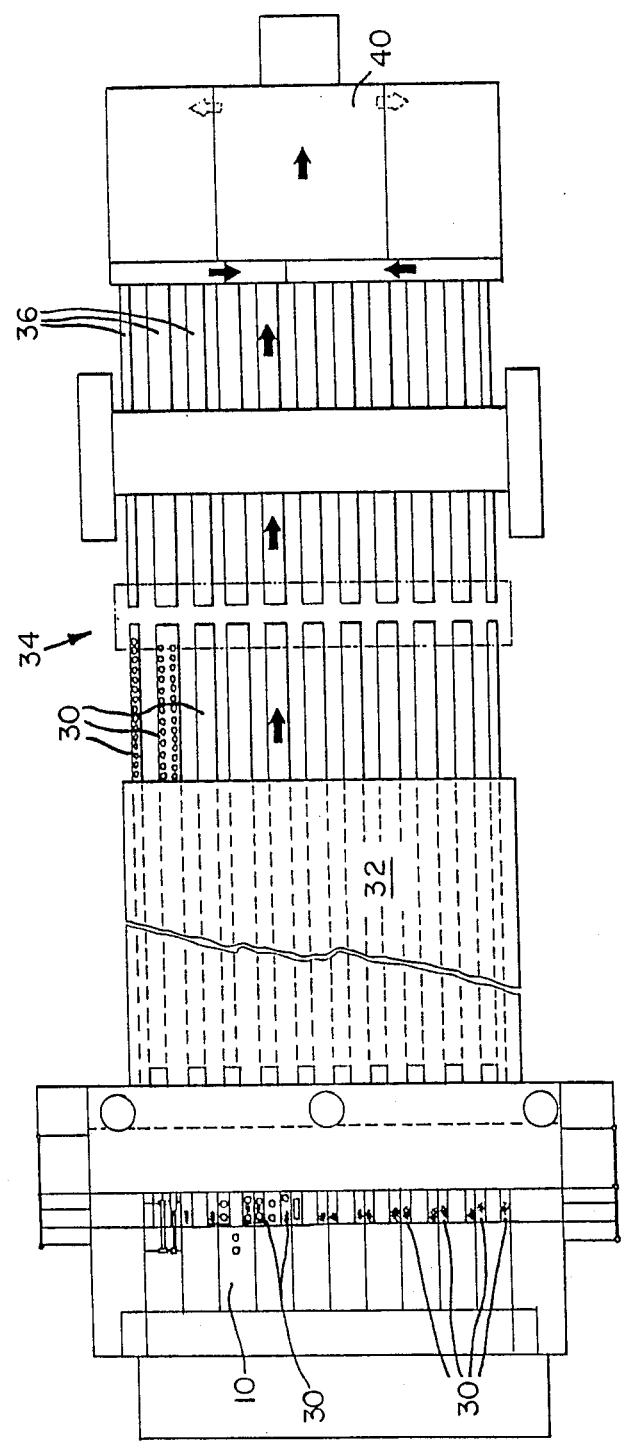
FIG. 2 is a plan view of a production line incorporating the machine of FIG. 1.

The machine 10 forms part of a production line shown in FIG. 2. In this production line, there are ten machines arranged side by side to form a ten-section individual section machine. Containers made by a section are deposited on one of two conveyor belts 30 associated with each section. These belts 30 are shared by adjacent sections 10 and there are eleven of them, two each with space for one track of containers at the ends of the row of ten sections, and nine which are shared by adjacent sections and each have space for two tracks of containers. The conveyor belts 30 extend parallel to the length of the machine 10, i.e. perpendicular to the row of sections 10.

The conveyor belts 30 extend through a lehr 32 to a cold end coating station 34 where the containers are spray coated or receive any other desired treatment before transfer to further conveyor belts 36. The belts 36 carry the containers through a cold end inspection station 38 and thence to a collection area 40. There are eleven of the belts 36, each aligned with one of the belts 30 and of the same width. It will be noted that once the containers are on the belts 30, they are not contacted by other mechanisms, except at the coating station 34 and possibly at the inspection station 38, until they arrive at the collection point 40. This minimises the damage possibilities. Furthermore, each track, there being either one or two tracks on each conveyor 30 or 36, contains containers only from one section 10. This makes it easy to correlate faults found by the inspection station 38 with faults in a particular section, without the need for the conventional mould number readers.

The take-out mechanism 14 is operable to remove completed containers from the moulding station 24 of the machine 10 and to deposit them on a conveyor 30. The mechanism 14 comprises a first gripper head 50a which provides first container gripping means operable to grip or release one or more containers (in FIG. 1 a second gripper head 50b is shown as constituted to grip three containers whereas in other drawings it is shown as constituted to grip two containers). The mechanism 14 also comprises a second gripper head 50b which provided second container gripping means operable to grip or release an equal number of containers as the first gripper head 50a. As is conventional, the section 10 can make one, two, three or more containers simultaneously in a like number of moulds and each gripper head 50a or 50b is arranged to grip the number of containers made simultaneously. As will become apparent, the gripper heads 50a and 50b are arranged to remove alternate groups of containers from the moulding station 24. The first containers made by the machine 10 are removed by the gripper head 50a, the second containers by the gripper head 50b, the third containers by the gripper head 50a, and so on.

The gripper heads 50a and 50b are substantially identical in construction as are parts associated therewith which are given reference numbers with suffix 'a' if they are associated with gripper head 50a and 'b' is they are associated with gripper head 50b.

The gripper heads 50a and 50b are now described on the assumption that they are to grip two containers at a time. To this end, each gripper head 50a and 50b has two pairs of tongs 52a or 52b which are each operable by a spring-return piston and cylinder assembly within the gripper head in conventional manner to grip or release a neck portion of a container.

First and second moving means are provided for respectively moving the first 50a and second 50b container gripping means. The first and second moving means are independently operable to move a respective one of the gripping means 50a and 50b. Each moving means comprises a vertically-disposed piston and cylinder 56a and 56b. The first gripper head 50a is mounted on the lower end of the piston rod 54a of the vertically-disposed piston and cylinder assembly 56a. Parallel to the assembly 56a and clamped thereto extends a telescopic tube 58a which enters the gripper head 50a and serves to supply operating air for provides linear motor means and is operable to lower the gripper head 50a from the level of the moulding station 24 to a level at which containers gripped by the tongs 52a can be deposited on to a conveyor 30. Reversal of the operation of the assembly 56a raises the gripper head 50a back to the level of the moulding station 24.

The upper end of the assembly 56a is secured to a head 60a which is mounted for horizontal sliding movement on a rod 62a. The rod 62a extends parallel to the centre-line of the machine 10, i.e. to a line joining the stations 22 and 24, between a crosshead 63a over the machine 10 and a crosshead 64a over the conveyors 30. The crosshead 63a is mounted for sliding movement on a fixed rod 66 supported by frame structure of the machine 10. The rod extends horizontally transversely of the machine, i.e. perpendicular to the direction of the rod 62a.

A further rod 68a extends between the crossheads 63a and 64a being parallel to and above the rod 62a. A piston (not shown) of a piston and cylinder assembly 70a of the first moving means is fixed on the rod 68a so that the operation of the assembly 70a causes the cylinder thereof to slide along the rod 68a. The cylinder of the assembly 70a is also secured to the head 60a. The assembly 70a provides a first horizontally-disposed linear motor means mounted at a higher level than the moulding station 24 and operable to move the gripper head 50a horizontally to and from the moulding station 24 along the centre-line of the machine.

A second horizontally-disposed linear motor means of the first moving means is provided by a piston and cylinder assembly 72a. This assembly 72a is disposed perpendicularly relative to the assembly 70a and is operable to move the gripper head 50a horizontally perpendicular to the centre-line of the machine towards and away from said centre-line.

Figure 4:
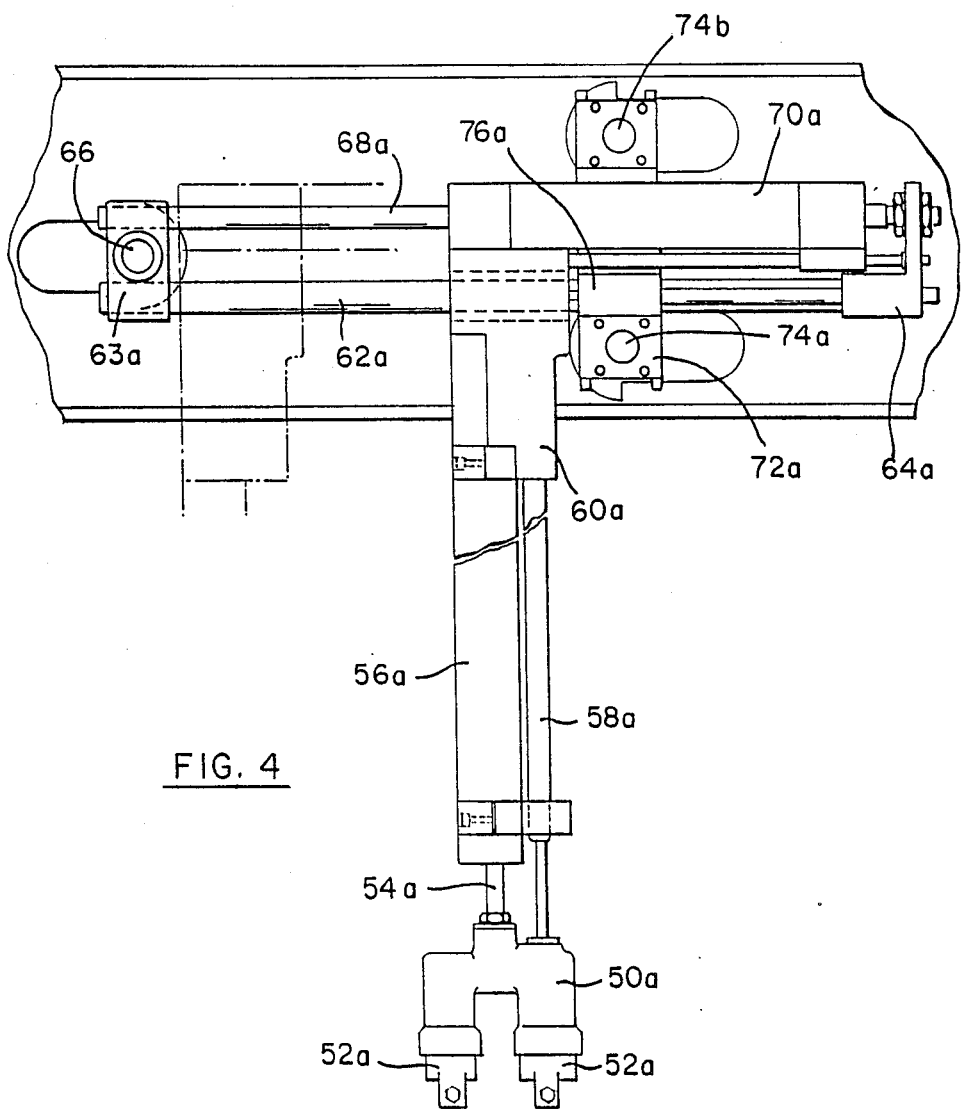
FIG. 4 is a side elevational view of the illustrative mechanism showing the other side to FIG. 1.

The assembly 72a comprises a piston (not shown) fixed on a horizontal rod 74a fixedly supported by the frame of the machine 10 and a cylinder slidable along the rod 74a. The cylinder of the assembly 74a has an upward projection 76a (FIG. 4) which is through which the rod 62a passes slidably so that the movement of the cylinder of the assembly 72a along the rod 74a results in movement of the rod 62a and, therefore, of the crosshead 63a (along rod 66), crosshead 64a, rod 68a, assembly 70a, head 60a, assembly 56a, and, therefore, of gripper head 50a.

A further horizontal rod 74b is fixedly supported by the frame of the machine 10 above the rod 74a. This rod 74b has the piston (not shown) of a piston and cylinder assembly 72b of the second moving means fixed thereon. The assembly 72b has a downward projection 76b which is slidable on a rod 62b (similar to the rod 62a). There are 'b' parts associated with the gripping head 50b viz. a rod 68b, a piston and cylinder assembly 70b, a crosshead 63b slidable on the rod 66, a crosshead 64b, a head 60b, a piston and cylinder assembly 56b and a telescopic tube 58b. The purposes of these parts are the same as the parts with the same numbers but suffix 'a' but in relation to the gripper head 50b.

Figure 3:
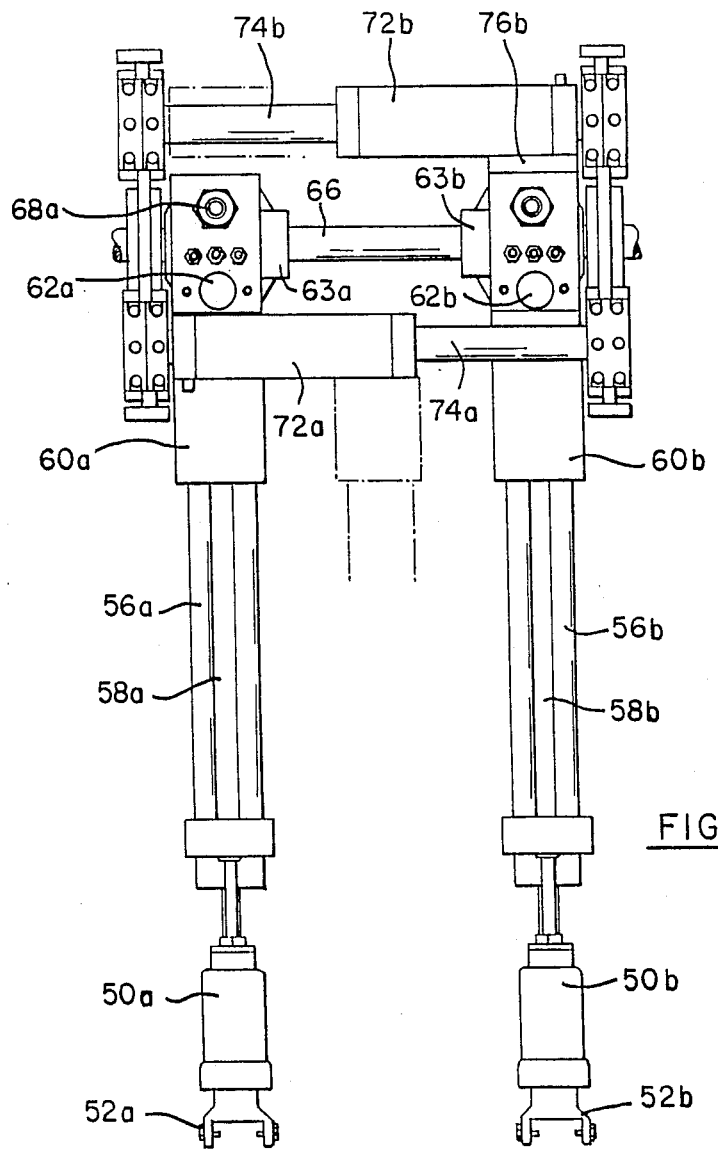
FIG. 3 is an end elevational view of the illustrative mechanism.

When the machine 10 has completed moulding a batch of one, two, three or more containers, the containers are left standing on one or more mould base plates at the moulding station 24. The gripper head 50a (for example) is to collect these containers and is moved into position to grip them. The assembly 58a raises the head 50a to the level of the moulding station 24, the assembly 72a moves the head 50a to the centre-line of the machine 10, and the assembly 70a moves the head 50a to the moulding station 24 along the centre-line of the machine 10 (to the right viewing FIG. 1). During this movement, the tongs 52a are open and pass the neck portions of the containers without contacting them. The tongs 52a are now closed gripping the containers. The mould bottom plate or plates are now lowered away from the containers leaving them suspended from the tongs 52a. Next, the assembly 70a is operated moving the head 50a horizontally along the centre-line of the machine 10 until the containers are clear of the moulding station 24. Once the containers are clear of the station 24, another batch of containers can be moulded in the station 24 and the assemblies 72a and 56a are operated, either successively or with their motions overlapping in time. The assembly 72a moves the containers gripped by the gripper head 50a horizontally away from the centre-line of the machine 10 (the motion is to the left viewing FIG. 3). The extent of this horizontal transverse movement is approximately one third of the width of the machine 10. The assembly 56a moves the containers downwardly from the level of the moulding station 24.

The effect of the movements caused by the assemblies 56a, 70a and 74a is to bring the gripped containers to a position on a conveyor belt 30. The tongs 52a are now opened releasing the containers on to the conveyor belt 30.

Figure 5:
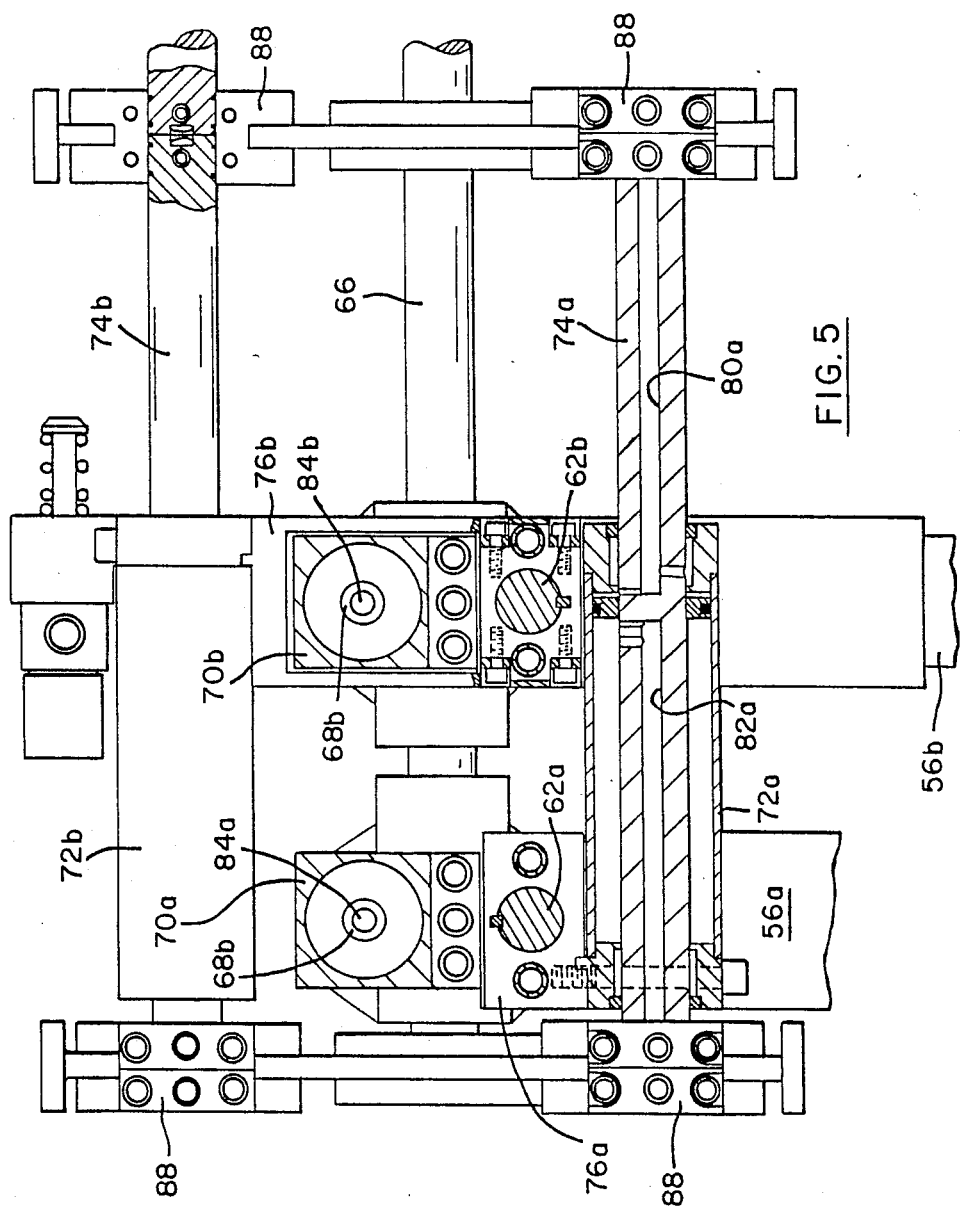
FIG. 5 is a view similar to FIG. 3 on an enlarged scale and with parts broken away to show the construction.

FIG. 5 shows that operating fluid is conducted to the assembly 72a through longitudinal bores 80a, 82a in the rod 74a and to the assemblies 70a and 70b through bores 84a and 84b in the rods 68a and 68b respectively. FIG. 5 also shows that the rods 74a and 74b are retained in clamps 88 from which they can be unclamped to allow replacement of the mechanism 14.

To gain access to the machine, the assemblies 72a and 72b are operated to move the heads 50a and 50b away from the centre-lne of the machine 10 so that access can be gained through a "tunnel" between the heads 50a and 50b.

I claim:

1. A take-out mechanism for removing finished containers from a selected pick-up location at a molding station of a container forming machine and carrying the removed containers to and depositing the removed containers on a conveyor comprising:
    first container gripping means including
        a first gripper head, and
        means for vertically displacing said first gripper head between selected elevated and lowered positions;
    second container gripping means including
        a second gripper head, and
        means for vertically displacing said second gripper head between selected elevated and lowered positions,
    means for supporting said first and second container gripping means including
        first and second spaced parallel rails for supporting said first and second container gripping means for horizontal displacement between advanced and retracted positions,
        means for displacing said first and second container gripping means along said first and second rails between said advanced and retracted positions,
        a third rail for supporting said first container gripping means for horizontal displacement in a direction transverse to said first and second rails from a retracted position spaced from and on one side of the pick-up location to the pick-up location,
        means for displacing said first container gripping means along said third rail between said retracted position and the pick-up location,
        a fourth rail parallel to said third rail for supporting said second container gripping means for horizontal displacement from a retracted position spaced from and on the other side of the pick-up location to the pick-up location, and
        means for displacing said second container gripping means along said fourth rail between said retracted position and the pick-up location.

2. A take-out mechanism according to claim 1 wherein said means for vertically displacing said first and second gripper heads each include a housing slidably supporting one of said first and second rails and one of said third and fourth rails.

* * * * *